(12) United States Patent
Back et al.

(10) Patent No.: US 9,739,313 B2
(45) Date of Patent: Aug. 22, 2017

(54) ROLLING-ELEMENT BEARING INCLUDING SEAL UNIT

(71) Applicants: Femke Back, Schweinfurt (DE); Jens Bettenhausen, Würzburg (DE); Steffen Hain, Karlstadt (DE); Matthias Hofmann, Schweinfurt (DE); Henning Kern, Schweinfurt (DE); Jochen Lorenscheit, Rimpar (DE); Christina Pfeuffer, Eußenheim (DE); Edgar Pickel, Sommerach (DE); Werner Schleyer, Reckendorf (DE); Mathias Seuberling, Großeibstadt (DE)

(72) Inventors: Femke Back, Schweinfurt (DE); Jens Bettenhausen, Würzburg (DE); Steffen Hain, Karlstadt (DE); Matthias Hofmann, Schweinfurt (DE); Henning Kern, Schweinfurt (DE); Jochen Lorenscheit, Rimpar (DE); Christina Pfeuffer, Eußenheim (DE); Edgar Pickel, Sommerach (DE); Werner Schleyer, Reckendorf (DE); Mathias Seuberling, Großeibstadt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/576,262

(22) Filed: Dec. 19, 2014

(65) Prior Publication Data

US 2015/0176652 A1  Jun. 25, 2015

(30) Foreign Application Priority Data

Dec. 19, 2013 (DE) .................. 10 2013 226 554

(51) Int. Cl.
*F16C 33/76* (2006.01)
*F16C 33/78* (2006.01)
(Continued)

(52) U.S. Cl.
CPC .............. *F16C 33/76* (2013.01); *F16C 19/28* (2013.01); *F16C 23/082* (2013.01);
(Continued)

(58) Field of Classification Search
CPC ...... F16C 23/08; F16C 23/082; F16C 23/084; F16C 23/086; F16C 23/088;
(Continued)

(56) References Cited

U.S. PATENT DOCUMENTS 2,566,448 A     9/1951  Heintz et al.
3,458,207 A *   7/1969  Conti .................. F16C 33/7836
                                                          277/582
(Continued)

FOREIGN PATENT DOCUMENTS

DE           1625578 B      11/1971
DE      102006036006 A1     2/2008
(Continued)

*Primary Examiner* — Phillip A Johnson
(74) *Attorney, Agent, or Firm* — Bryan Peckjian; SKF USA Inc. Patent Dept.

(57) ABSTRACT

A rolling-element bearing includes a first bearing ring, a second bearing ring, and a seal unit formed in a multiple-piece manner, the seal unit including an at least part-ring shaped main element which is freely rotatable with respect to the first bearing ring and the second bearing ring and at least one seal lip. In addition, the main element and the seal lip are exchangeably connectable to each other.

17 Claims, 15 Drawing Sheets

(51) Int. Cl.
  *F16C 19/28* (2006.01)
  *F16C 23/08* (2006.01)
  *F16C 19/38* (2006.01)
(52) U.S. Cl.
  CPC ........ *F16C 23/086* (2013.01); *F16C 33/7806* (2013.01); *F16C 33/7836* (2013.01); *F16C 33/7893* (2013.01); *F16C 19/38* (2013.01)
(58) Field of Classification Search
  CPC .............. F16C 33/7836; F16C 33/7806; F16C 33/7886; F16C 33/7893
  USPC ......... 277/582; 384/481, 482, 484–486, 558, 384/568, 495–498
  See application file for complete search history.

(56) References Cited

U.S. PATENT DOCUMENTS 5,069,560 A * 12/1991 Niedermeier ....... F16C 33/3806
  384/486

2005/0058382 A1 * 3/2005 Williams ............... B62K 21/06
  384/568
2013/0322803 A1 * 12/2013 Gruber .................. F16C 23/086
  384/477

FOREIGN PATENT DOCUMENTS

| DE | 102007036891 A1 | 2/2009 |
| DE | 6602654 U | 9/2011 |
| DE | 1020100126 | 9/2011 |
| DE | 102010012664 A1 | 9/2011 |
| DE | 102012207745 | 11/2013 |
| DE | 102013000141 | 5/2014 |
| JP | H0630530 U | 4/1994 |
| JP | H06030530 U | 4/1994 |
| JP | 2006307953 A | 11/2006 |
| JP | 2007198540 | 8/2007 |
| JP | 2007198540 A | 8/2007 |
| JP | WO 2011027662 A1 * | 3/2011 ............. F16C 19/52 |

* cited by examiner

ROLLING-ELEMENT BEARING INCLUDING SEAL UNIT

CROSS-REFERENCE

This application claims priority to German patent application no. 10 2013 226 554.9 filed on Dec. 19, 2013, the contents of which are fully incorporated herein by reference.

TECHNOLOGICAL FIELD

The present disclosure is directed to the field of rolling-element bearing seals.

BACKGROUND

Known bearing seals can protect a rolling-element bearing against dirt and contamination. However, these seals are generally configured for use with a bearing of a particular type or size and can only be adapted with difficulty for use with other bearings. This limits the number of each seal made and requires manufacturing seals of many different sizes and shapes. In addition, it can be difficult to replace an installed seal because a complex and cost-intensive disassembly effort is often needed to remove parts to allow the seal to be replaced. This is a particular problem in the field of large bearings having a diameter of approximately 400 millimeters or larger, bearings used, for example, in wind turbines.

FIG. 14 illustrates a conventional seal in a large bearing 112 as a comparative example. The large bearing 112 is sealed on two sides by so-called labyrinths (labyrinth seals) 140 which are formed by labyrinth rings 114. The seal is accordingly composed of labyrinth rings 114 provided on both sides that form labyrinth-shaped sealing gaps, the so-called labyrinths 140. The meandering geometry of the labyrinths 140 thus formed makes it harder for foreign matter to penetrate into the region to be sealed, for example, to the rolling elements 130 or the raceways of the bearing rings 120. In this seal variant, all of the intervening spaces of the labyrinth 140 and also of the rolling-element bearing 112 are usually filled with grease or lubricant. In addition, a supporting, so-called V-ring 116 can be used on or in the labyrinth 140. The sealing effect can be additionally supported by periodic relubrication. All of the components mentioned can be cost factors. Moreover, the labyrinth rings 114 forming the labyrinth 140 extend beyond the width of the actual rolling-element bearing 112, in other words beyond the width of the bearing ring 120, and can thereby occupy valuable space inside a machine. The most massive embodiments of the labyrinth rings 114, for example, those made from cast iron such as grey cast iron, create further assembly and operational disadvantages due to their own weight.

Large bearings can also be protected by contacting sealing rings. These may comprise radial shaft seal rings, possibly including upstream dust lips, which are held in position using, e.g., cast support parts. These support parts likewise constitute a large mass and thus a large weight to be moved during assembly. This makes it impossible or at the very least difficult and expensive, to exchange the seal ring.

The two above-mentioned sealing concepts have the segregation from the rolling-element bearing in common. Therefore, the bearings can only be filled with lubricant in the assembled state. Such seals can only be installed after the assembly of the bearing, and only thereafter can the bearing be filled with lubricant.

In addition, integrated sealing concepts are known which are embodied purely from elastomer, and may be, e.g. bellows-shaped (see German patent document DE 10 2007 036 891 A1). Bearings with such seals scan be prelubricated—at a factory before delivery, for example. However, it may be difficult to achieve (or adequately achieve) the required seal system stiffness for large bearing diameters. Moreover, due to the closed geometry of the seal ring, it may be difficult or impossible to exchange the seal without disassembling the rolling-element bearing.

The existing sealing concepts discussed herein also accommodate only a limited bearing misalignment or tilt and fail to provide adequate sealing when a maximum tilt is exceeded. Especially in the case of self-aligning bearings, such as spherical roller bearings or compact aligning roller bearing (CARB) toroidal roller bearings, the maximum possible tilting of a bearing inner ring with respect to a bearing outer ring can be severely limited by conventional seals. This can lead, during installation of the bearing or in actual operation, to a rolling-element bearing roller bumping against the seal element. This in turn may damage the roller set, the seal element, or even the attachment mechanism on the respective bearing ring and lead to significant repair costs or an impairment of the service life of the bearing.

In addition, the support parts of the contacting sealing rings can also be manufactured from welded metal-plate structures and integrated in the rolling-element bearing so that no components extend beyond the external dimensions of the rolling-element bearing. In this case an exact aligning/centering of the seal lips to the associated seal countersurface (opposite seal contact surface) should occur via a defined reference position on the component (e.g. outer ring) supporting the seal lip. In these cases the reference position is realized by circulating reference grooves, reference surfaces, reference bores, reference edges, or the like. Due to the precision required in positioning these reference indicia, they must be produced by expensive and high-precision processes, such as, for example, hard turning. The methods mentioned are associated with high manufacturing costs. Furthermore, if components are disposed between the reference position on the supporting component and the seal lip to be centered, these must also be precisely positioned in order to maintain the necessary precision in view of the tolerance chain. These alignment requirements of the components are also associated with effort and cost.

In all seal concepts with contacting seal rings there can be significant friction losses depending on the quality of the paired surfaces (seal lip to countersurface). These energy losses could far exceed the actual power dissipation of the rolling-element bearing. Furthermore, signs of wear are also associated with the friction losses mentioned. In addition, the seal (seal lip) and the associated countersurface wear over their service lives, and after reaching a certain wear condition the seal ring should be replaced. A repair is much more difficult with worn countersurfaces. With external sealing concepts in the field, any scratches/scoring/markings/physical wear can be eliminated by so-called wear sleeves; however the installation of wear sleeves is complex and expensive. On the other hand, with integrated seal concepts, repair methods can be difficult or even impossible.

SUMMARY

There is therefore a need to provide an improved concept for sealing rolling-element bearings.

Exemplary embodiments provide a rolling-element bearing including a first bearing ring, a second bearing ring, and a seal unit, wherein the seal unit comprises an at least part-ring shaped main element which is rotatable with respect to the first and the second bearing ring. The rolling-element bearing can be, for example, a ball bearing, a barrel roller bearing, a tapered roller bearing, or a bearing including a single-row or multi-row arrangement of rolling elements. The first bearing ring can be attached to a stator. The second bearing ring can be attached to a rotor. Both the first bearing ring and the second bearing ring could be an inner bearing ring or an outer bearing ring.

In some exemplary embodiments the seal unit is manufactured at least partially from a flexible, elastic material. For this purpose elastomers, for example, certain types of plastic or rubber-type materials, can be used. The term "seal unit" indicates that a penetration of certain substances from one side of the seal unit to the other is to be prevented. These substances can include dirt particles (e.g. soot, fine dust, sand, or mud), gases or vapors (e.g. oxygen, vapors of fuels or solvents, or also vapors of toxic or corrosive substances) or liquids (e.g. water, acids, lyes, oil), or also materials such as greases.

An at least part-ring shaped element can, for example, be formed by a complete ring, or also by parts of a ring, for example by ring segments. In addition to ring segments, however, embodiments are also possible wherein a ring can be assembled from parts having irregular shapes. An embodiment comprising a plurality of ring segments could significantly facilitate maintenance because the installation and removal can be performed without completely removing the entire rolling-element bearing. If, for example, the element is segmented, a connection of the individual segments can be formed, for example, by connecting plates, screws, adhesion, or welding.

In some exemplary embodiments the seal unit can be at least partially manufactured from a seal material. A seal material can be, for example, a plastic, e.g. polyurethane, nitrile rubber (nitrile butadiene rubber (NBR), hydrated nitrile butadiene rubber (HNBR)), depending on the type of material that is to be hindered from penetrating or escaping past the seal unit. The seal unit could be manufactured at least partially from metal or metal alloys or from particularly low-friction plastics such as, e.g., polytetrafluoroethylene (PTFE), or plastics having a high stiffness. Plastics having high stiffness could be, for example, so-called thermosets (thermosetting materials).

Furthermore, the materials used could facilitate mass production by methods such as injection molding, vulcanization, etc. Production costs, material costs and weight could thus be saved. The attaching can occur in an interference-fit, friction-fit, or materially-bonded manner. Possible attachment means could comprise, for example, a screw, an adhesive surface, a welded surface, a soldered joint, a rivet, a bore, a thread, or a system including a groove and spring. The bearing ring of the rolling-element bearing can be a bearing inner ring or a bearing outer ring. Furthermore, the element could be plate-shaped. A plate-shaped element could also be understood to be a thin element; in other words, one of the three spatial dimensions (thickness) could be very small with respect to the other two spatial dimensions (length, width). In exemplary embodiments the thickness could respectively be up to 1%, 2%, 5%, 10%, etc. of the length or width. Using a plate-shaped embodiment of the element a significant amount of volume (installation space) and thus also weight can be saved.

Moreover, in some exemplary embodiments the seal unit can be integrated into an already-existing rolling-element bearing. Due to the simple construction, the concept could be used on any rolling-element bearing, independent of design, bearing series, or diameter. The seal unit could thus be used flexibly. Compared to the conventional solution of the labyrinth seal, such as is used, for example, in wind turbines, the space to be filled by a lubricant could be substantially reduced, thus allowing a smaller quantity of lubricant to be used. Moreover, in some exemplary embodiments the seal unit can be embodied from light material. This could reduce material costs and weight, and thus make installation simpler and faster. A factory prelubricaiton could reduce the likelihood of, or even prevent, contamination during installation of the otherwise unsealed, open bearing.

Rotatability of the main element with respect to the first and the second bearing rings refers to a rotatability in a direction tangential to the first or the second bearing ring. In other words, free rotation of the main element independently of the bearing rings. Furthermore, a rotational speed of the main element could differ from the respective rotational speeds of the first bearing ring or of the second bearing ring. Thus during operation of the rolling-element bearing, the rotational speed of the main element could also be reduced to as low as half of a difference between the rotational speed of the first bearing ring and the rotational speed of the second bearing ring. Frictional forces could thereby be reduced or minimized, and wear thereby reduced as well.

In exemplary embodiments the seal unit optionally additionally comprises at least one seal lip which is rotatable with respect to the main element, the first bearing ring, or the second bearing ring. The main element and the at least one seal lip can be manufactured in one-piece from the same material, or also in multiple pieces (multiple-piece), or from different materials. A "one-piece component" is understood to mean a component that is manufactured from one continuous piece of material. A "component or structure provided or manufactured one-part" or a "component or structure provided or manufactured integrally with at least one further component or structure" is understood to mean one which cannot be separated from the at least one further component without destroying or damaging one of the at least two participating components. A one-piece component thus also represents at least one component integrally manufactured or one-part with another structure of the respective component.

In addition, in some embodiments the seal lip or seal unit can be at least partly manufactured from rubber-type materials or from low-stiffness plastics—elastomers or some thermoplastics, for example. The use of seal materials may produce less wear on a sliding surface and provide good sealing. In addition, any collisions with rolling elements could be significantly damped by the material. The materials used could also allow for mass production using methods such as injection-molding, vulcanization, etc., and this in turn would reduce production costs, material costs and weight.

Additionally or alternatively, in exemplary embodiments a seal surface of the seal lip contacts a radially extending end surface of the main element, of the first bearing ring, or of the second bearing ring, or a groove of the first bearing ring or of the second bearing ring. Many possibilities are thus available regarding where sealing can occur using the seal lip. This location could form a rubbing or sliding contact with the seal lip. This location could be a groove of the first or second bearing ring having any orientation, or also an end surface of the first or second bearing ring, which end surface extends at least partially in the radial direction. In this case, the seal lip could, for example, be attached to the main element. For this purpose the seal unit comprising the main element and the seal lip could be formed in one-piece or as one-part.

The seal unit can be manufactured from a single material or from several different materials. In addition, the main element and the seal lip could be manufactured from different materials. Another possibility would be to provide the seal lip on an end surface of the main element, which end surface extends at least partially in the radial direction. For this purpose the seal lip could be attached to the inner bearing ring or to the outer bearing ring. The seal lip could then press against an inclined surface of the main element, which inclined surface extends at least partially in the radial direction. The direction of pressing of the seal lip could have a non-zero axial vector component. The seal lip could be attached to the inner or outer bearing ring, and be in sliding contact with the main element, or vice versa. In principle the term "contact" here refers to the presence of a sliding contact, or an interference-fit, friction-fit, or materially-bonded connection. Furthermore there is also the possibility that the seal lip is in sliding contact with one of the two bearing rings and the main element. A connection of the main element to the first or second bearing ring could be produced indirectly via at least one seal lip. The location at which the sealing is performed by the seal lip could be chosen based on the field of use in order to reduce or minimize friction losses. This may help reduce wear and extend the service life of the seal lip.

Additionally or alternatively, in exemplary embodiments the main element is attached to a bearing cage of the rolling-element bearing. The rotational speed of the main element is thereby determined by the rotational speed of the bearing cage and identical thereto. The exact value of the rotational speed of the main element could depend on the respective raceway radii of the bearing inner ring and of the bearing outer ring. As a rule the rotational speed of the main element is lower than the speed of the rotating bearing ring relative to the stationary bearing ring. For example, the speed of the main element could be one third the speed of the rotating bearing ring, which reduced speed would reduce or minimize friction occurring on the sliding surfaces, and wear occurring on the seal unit could also be reduced. Attaching the main element to the bearing cage helps prevent the rolling elements from colliding with the main element (perhaps during too-severe tilting of a spherical roller bearing).

Additionally or alternatively the seal lip includes a seal surface for sealing against the main element and is attached to the first bearing ring or the second bearing ring. The seal lip could then rotate at the speed of the first or second bearing ring, while the main element has a different rotational speed than that of the seal lip. Friction forces could be further reduced by the choice of the plastic from which, for example, the main element could be manufactured. A suitable plastic for this purpose would be PTFE. In a further exemplary embodiment the first bearing ring and the second bearing ring could each have a seal lip so that during operation of the rolling-element bearing a differential rotation could be achieved between the first bearing ring including a seal lip, the main element, and the second bearing ring including a seal lip.

Additionally or alternatively the seal lip includes a seal surface for sealing against the first bearing ring or the second bearing ring and is attached to the main element. In these exemplary embodiments the seal lip and the main element can be manufactured in one-part or in one-piece, considerably simplifying a manufacturing process. In turn a plurality of seal lips could be available, each of which are in sliding contact with the first bearing ring and the second bearing ring. Such a construction could be held in position only by grooves on the first bearing ring and the second bearing ring. Such a construction could also be used in a spherical roller bearing and jump out or dislocate from the grooves during too-severe tilting of the spherical roller bearing. This could reliably prevent a collision with the rolling elements. However, as was already stated, the main element and the seal lip could be manufactured from different materials. In this case a high stiffness of the seal unit could be achieved, and the sealing function of the seal lip simultaneously maintained by the appropriate choice of materials. As already described, this construction of the main element and the seal lip could be supported by grooves of the bearing ring but could alternately be attached to the bearing cage. If the seal unit is only held in its position by grooves on the bearing rings, and depending on the friction resistance occurring at the two grooves, the rotational speed of the seal unit could be set at an energy efficient level. This could correspond to a rotational speed at which a sum of the friction forces occurring or the total wear is kept small. In exemplary embodiments in which the seal unit is additionally attached to the bearing cage, the rotational speed is determined by the bearing cage. However, the exact value of the rotational speed could be further influenced, for example, by the choice of the radius of the rolling elements or of the bearing inner ring or of the bearing outer ring.

Optionally, in an exemplary embodiment the seal lip may include a seal surface for sealing the first bearing ring or the second bearing ring and be attached to the main element. After installation in the rolling-element bearing, the main element or the at least one seal lip will be symmetric with respect to a plane which is perpendicular to an axis of rotation of the rolling-element bearing. Thus if the bearing is at rest, the main element or the seal lip can have a symmetry relative to a radially extending plane (in other words, a mirror symmetry). Stated differently, each of two side surfaces could face towards or away from the rolling elements. Installation errors due to a possible reversal of the "inside" and the "outside" could be prevented by the symmetrical nature of the seal lip. Maintenance and installation can thereby be simplified. The manufacturing of the seal lip or of the main element could also be simplified by the symmetry. As used herein, the axis of rotation could be an axis of rotation in a non-tilted bearing; however in a spherical roller bearing the axis of rotation could also be an axis of rotation of a tilted bearing ring of the bearing.

Additionally or alternatively, in exemplary embodiments the main element or the seal lip are exchangeably connectable to each other and/or to the first bearing ring, the second bearing ring, or the bearing cage. In other words the main element or the seal lip may be individually exchangeably connectable. Furthermore, the main element and the at least one seal lip could form a structural unit (connected to each other) and be exchangeably connectable as a unit to the first bearing ring, the second bearing ring, or the bearing cage. "Exchangeably connectable" here means that a low-effort removal is possible (for example without need for a tool), that a damage-free removal is possible, that a connection is releasable and restorable, that the main element or the seal lip is repeatedly connectable or exchangeable, or that the main element or the seal lip is reversibly connectable. Due to the exchangeable connectability, installation and maintenance processes may be accelerated and simplified. In addition, damage or wear to these or other parts of the bearing could be prevented if the main element or the seal lip is removed, for maintenance purposes for example.

Additionally or alternatively, in exemplary embodiments the rolling-element bearing has an outer diameter or an outer radius of at least 400 mm. The diameter or radius can be measured radially to an axis of rotation of the bearing. Bearings having an outer diameter or outer radius of 400 mm or more are often referred to as "large bearings." Large bearings can be used, for example, in the field of energy generation (e.g. wind turbines, underwater turbines, turbines in general). With a large bearing, maintenance, installation, or replacement of a conventional seal can be expensive. The embodiment of the element in a plurality of disk-parts or ring-parts could significantly reduce this expense. A sealing of large bearings using the described seal unit could save significant amounts of material and thus also weight. Manufacturing costs and manufacturing effort could also be reduced by a considerable degree, and mounting the seal unit on the bearing could also occur before (or after) the installation of the bearing itself.

Additionally or alternatively, in exemplary embodiments the first bearing ring and the second bearing ring are also tiltable with respect to each other by a limited angle. This may occur, for example, in a spherical roller bearing. The maximum possible tilting of two bearing rings with respect to each other can be a fraction of a degree, but also a plurality of degrees, for example 2 or 3 degrees. The seal unit could be attached to an inner bearing ring so that a collision with the rolling elements is avoided when the two bearing rings tilt with respect to each other. The use of a seal lip, which can be manufactured, for example, from elastomer, could provide so much clearance during tilting that the sealing function of the seal lip is maintained even during a tilting of, for example, of one or two degrees. If the seal unit is attached to the outer bearing ring, manufacturing the seal unit from plastic, for example, could significantly reduce damage during severe tilting of both bearing rings with respect to each other, which damage could result from a collision of the seal unit with the rolling elements.

Furthermore, in exemplary embodiments the seal unit additionally or alternatively has at least one liquid-permeable bore. If such so-called "grease outlet bores" are incorporated in the seal unit, used lubricant could be discharged or pumped in an efficient and directed manner using, e.g., hoses/tubes, or collecting tanks attached directly to the bores. Contamination of surrounding components and the surrounding space could thus be avoided.

BRIEF DESCRIPTION OF THE DRAWINGS

Exemplary embodiments are described and explained in more detail below with reference to the accompanying Figures.

DETAILED DESCRIPTION

Figure 1:
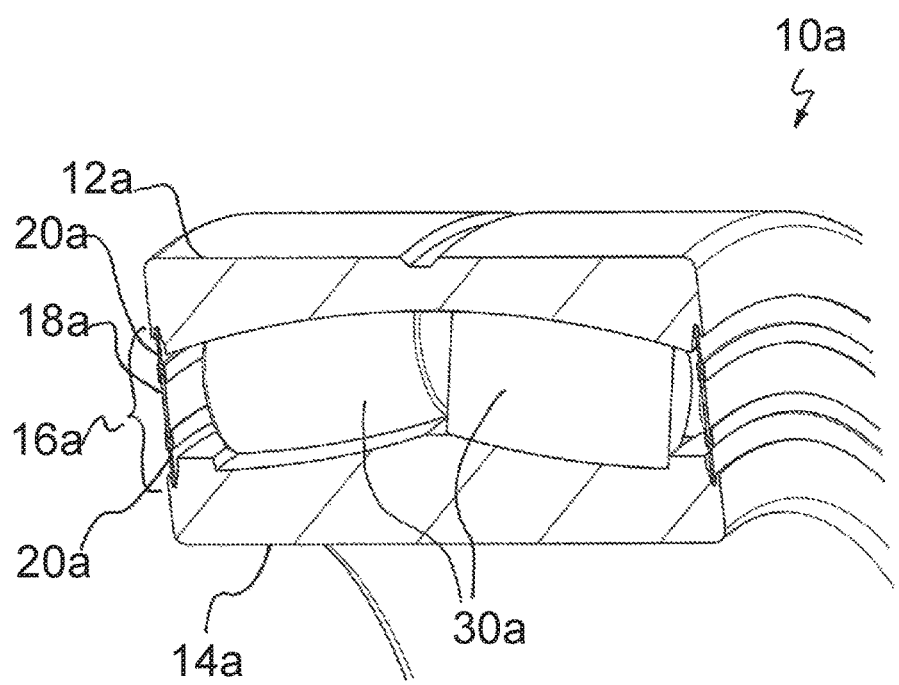
FIG. 1 shows a seal unit in a rolling-element bearing according to a first exemplary embodiment.

In the following description of the accompanying Figures, which show exemplary embodiments of the present disclosure, identical reference numerals indicate identical or comparable components. Furthermore, summarizing reference numerals may be used for components and objects that appear multiple times in an exemplary embodiment or in an illustration, but that are described together in terms of one or more common features. Components or objects that are described with the same or summarizing reference numerals can be embodied identically, but also optionally differently, in terms of individual, multiple, or all features, their dimensions, for example, as long as the description does not explicitly or implicitly indicate otherwise.

In the following, lower-case letters "a," "b," "c," "d," and "e" appended to a reference number respectively refer to different exemplary embodiments. Thus, for example, the reference numbers "10a" and "10b" can indicate two counterparts/instances of the same component in respective different embodiments.

Referring now to the drawings, a first exemplary embodiment is described with reference to FIGS. 1-2, a second exemplary embodiment with reference to FIGS. 3-8, and a third exemplary embodiment with reference to FIGS. 9-13.

Exemplary embodiments relate to a rolling-element bearing including a first bearing ring, a second bearing ring, and a seal unit, wherein the seal unit comprises an at least part-ring shaped main element which is rotatable with respect to the first bearing ring and the second bearing ring. A first exemplary embodiment thereof is depicted in FIG. 1. A perspective cross-section through a rolling-element bearing 10a can be seen, which rolling-element bearing 10a comprises a first bearing ring 12a, a second bearing ring 14a, and two rows of rolling elements 30a. In the present exemplary embodiment, the first bearing ring 12a corresponds to the outer bearing ring and the second bearing ring 14a corresponds to the inner bearing ring. However, this arrangement can also be reversed. The rolling elements 30a are barrel-shaped and arranged in two rows and are guided by two raceway grooves in the inner bearing ring 14a. In other exemplary embodiments the rolling elements 30a; 30b; 30c can also have other shapes, for example a spherical shape, cylindrical shape, or conical shape. The arrangement of the rolling elements can be single row or multi-row. Furthermore the rolling-element bearing 10a includes a seal unit 16a.

In the three exemplary embodiments presented herein (see FIGS. 1-13), the seal unit 16a; 16b; 16c can additionally comprise at least one seal lip 20a; 20b; 20c which is rotatable with respect to the main element 18a; 18b; 18c, the first bearing ring 12a; 12b; 12c, or the second bearing ring 14a; 14b; 14c. The seal unit 16a in FIG. 1 comprises a thin, plate-shaped main element 18a and two seal lips 20a. In this first exemplary embodiment the seal lips 20a are freely rotatable with respect to the outer bearing ring 12a and the inner bearing ring 14a, but are not freely rotatable with respect to the main element 18a. The main element 18a is freely rotatable with respect to the bearing rings 12a and 14a, and the main element can be manufactured in segments or in one piece.

FIG. 1 shows, for example, a main element 18a formed in one-piece. In the case of a main element formed as segments, the connection of the individual segments could be formed, for example, by connecting plates, screws, adhesion, welding, etc. Two seal lips 20a are attached to the main element 18a. However, in other exemplary embodiments only one seal lip, or even more than two seal lips, could be present.

Figure 2:
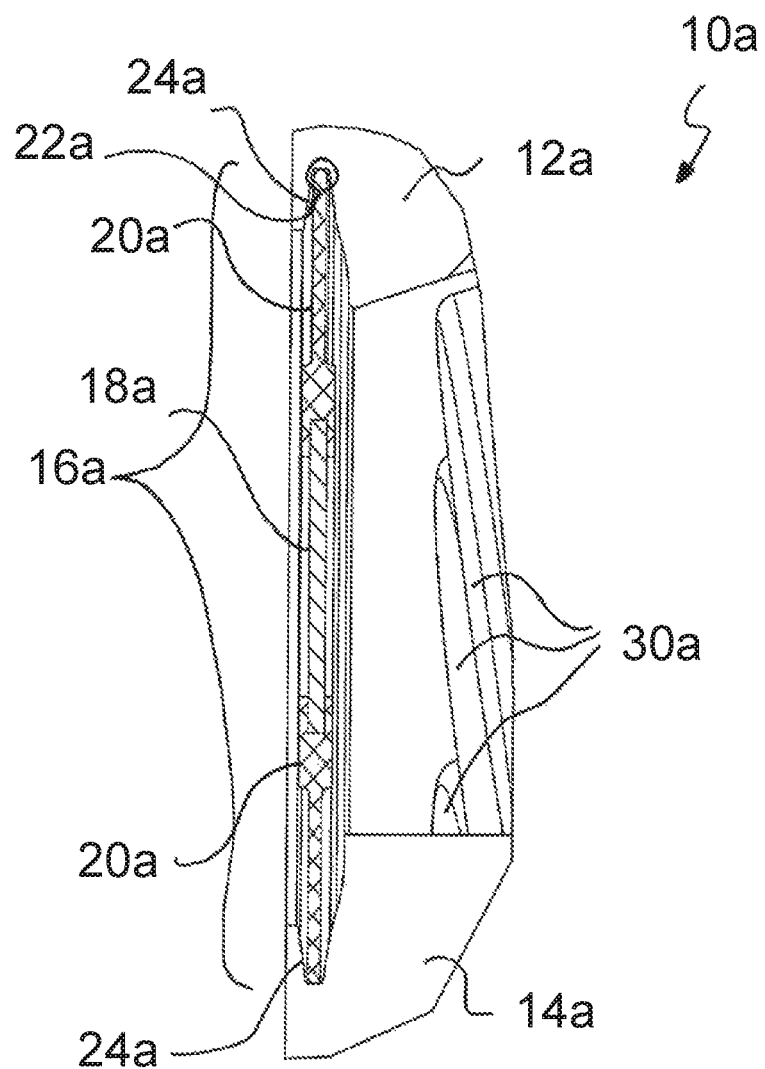
FIG. 2 shows a detail view of a seal unit in a rolling-element bearing according to a first exemplary embodiment.

The first exemplary embodiment is illustrated again in FIG. 2. The cross-section through the rolling-element bearing 10a is shown here in plan view. Only a section is shown, which depicts a cross-section through the seal unit 16a and a partial cross-section through the outer bearing ring 12a, the inner bearing ring 14a, and the rolling elements 30a. The main element 18a is fixedly connected to the seal lips 20a. In the three exemplary embodiments the seal lips 20a; 20b; 20c can include a seal surface 22a; 22b; 22c for sealing against the first bearing ring 12a; 12b; 12c or the second bearing ring 14a; 14b; 14c, and be attached to the main element 18a; 18b; 18c. In FIG. 2 the seal lip 20a includes a seal surface 22a opposite the attachment to the main element 18a, wherein the present first exemplary embodiment comprises two seal lips 20a. Their seal surfaces 22a are respectively in contact with the first bearing ring 12a and the second bearing ring 14a.

As the three exemplary embodiments described with reference to the Figures show, the seal surface 22a; 22b; 22c of the seal lip 20a; 20b; 20c contacts a radially extending end surface of the main element 18a; 18b; 18c of the first bearing ring 12a; 12b; 12c or of the second bearing ring 14a; 14b; 14c, or a groove 24a of the first bearing ring 12a; 12b; 12c or of the second bearing ring 14a; 14b; 14c.

In FIG. 2 both the outer bearing ring 12a and the inner bearing ring 14a include a groove 24a. These grooves are contacted by the seal surfaces 22a of the seal lips 20a. In other words, the seal lips 20a form a seal at the grooves 24a. In FIG. 2 the entire seal unit 16a is loosely inserted into the two grooves 24a. As an alternative to the embodiment shown in FIG. 2, the seal unit 16a could also be formed as a single piece (one-piece embodiment). As shown in the Figures, in some exemplary embodiments the seal unit 16a; 16b; 16c, the main element 18a; 18b; 18c, or the seal lips 20a; 20b; 20c can be manufactured at least partially from elastomer, metal plate, or plastic. Due to the loose arrangement (sliding contact of the seal surfaces 22a of the seal lips 20a to the grooves 24a of the bearing rings 12 and 14a), the relative speeds between the seal surfaces 22a and the grooves 24a, which serve as countersurfaces for the seal lips 20a, can be reduced by a factor of 2 (reduced by half). However, depending on friction conditions, the relative speed on the outer bearing ring could be reduced by less than half, and simultaneously on the inner ring by more than half, or vice-versa. It can further be recognized in FIG. 2 that the two bearing rings 12a and 14a do not extend from the rolling elements 30a beyond the seal unit 16a. It could thereby be possible, for example, to maintain an installation space specified by the International Organization for Standardization (ISO).

In the exemplary embodiments shown in the Figures, after installation in the rolling-element bearing 10; 10b; 10c, the main element 18a; 18b; 18c or the at least one seal lip 20a; 20b; 20c is symmetric with respect to a plane which is perpendicular to an axis of rotation of the rolling-element bearing. In FIG. 2 it is clear that the side of the seal unit 16a facing the rolling elements 30a, and the side of the seal unit 16a facing away from the rolling elements 30a, are mirror-symmetric to each other. Possible installation errors could be precluded (avoided) by such a symmetric construction.

Figure 3:
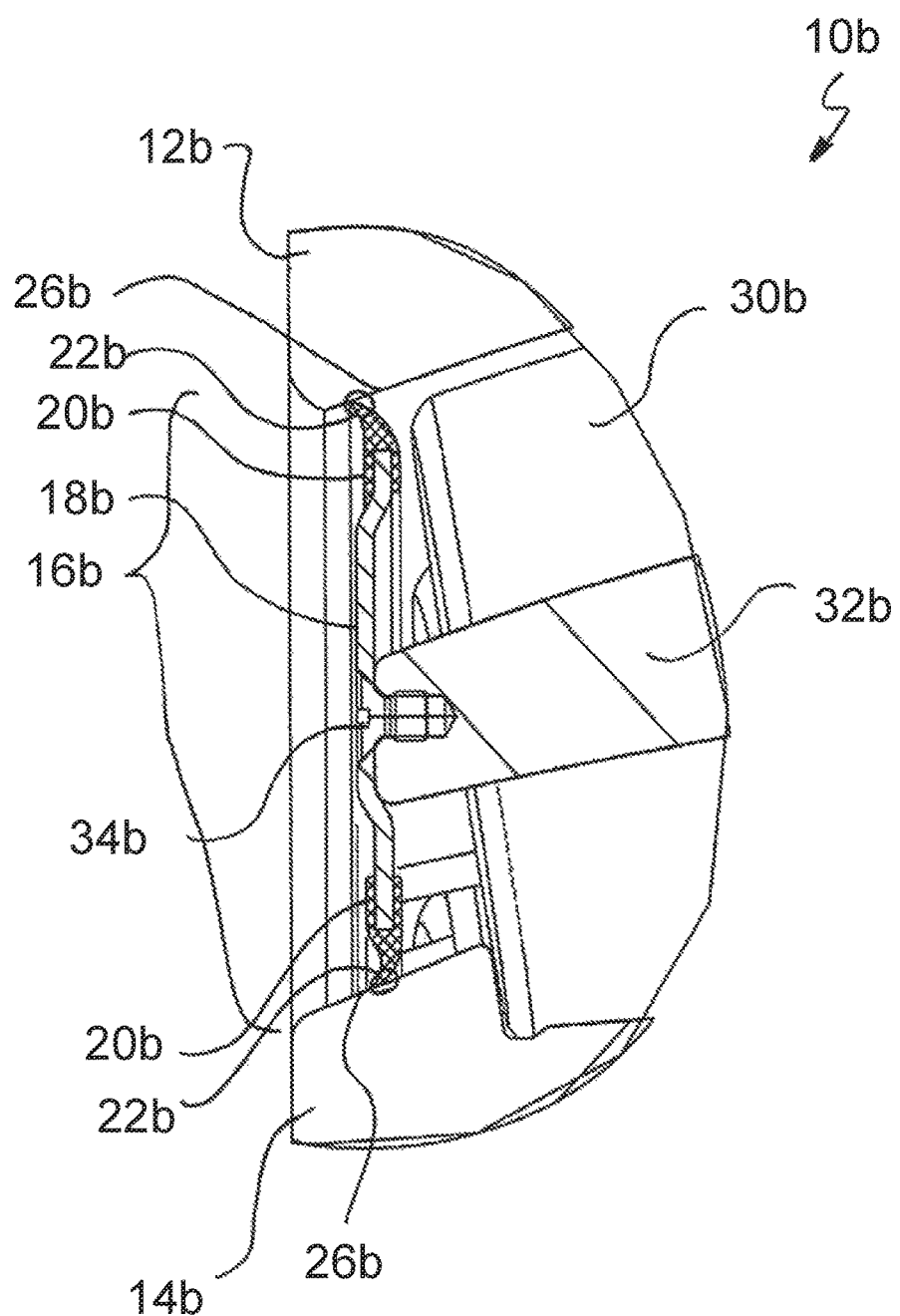
FIG. 3 shows a seal unit in a rolling-element bearing according to a second exemplary embodiment.

FIG. 3 shows a seal unit 16b in a rolling-element bearing 10b according to a second exemplary embodiment. The rolling-element bearing comprises an outer bearing ring 12b, an inner bearing ring 14b, and a plurality of rolling elements 30b. Furthermore, the rolling elements 30b are disposed in a bearing cage 32b. The seal unit 16b comprises a main element 18b, which is plate-shaped, and two seal lips 20b that are attached to the main element. The two bearing rings 12b and 14b in this case each have an end surface 26b, each of which is contacted by the end surfaces 22b of the two seal lips 20b. The end surfaces 26b of the bearing ring 12b and 14b could be economically manufactured when the raceways for the rolling element 30b are ground, resulting in a very good quality of these end surfaces 26b.

Furthermore, in the second and third exemplary embodiments the main element 18b; 18c is attached to the bearing cage 32b; 32c of the rolling-element bearing 10b; 10c. In FIG. 3 the main element 18b is attached to the bearing cage 32b using an attachment means 34b. The attachment means 34b is depicted here as a screw, which is understood, however, to only be an example. The attachment means 34b could equally be, for example, a solder surface, adhesive surface, or weld surface, or a bolt, or a plug-in or clamp connection. In general the main element 18b could be attached to the bearing cage 32b in an interference-fit, friction-fit, or materially-bonded manner. The main element 18b could be manufactured, for example, from steel, light metal, or plastic. Since the main element 18b is attached to the bearing cage 32b, its rotational speed is reduced as compared to a rotating bearing ring 12b or 14b. Higher rotational speeds of the bearing could be made possible by the the reduction of friction forces and wear associated with the reduced rotational speed of the main element 18b relative to a rotating bearing ring 12b or 14b.

In some exemplary embodiments the main element 18a; 18b; 18c or the seal lip 20a; 20b; 20c can be exchangeably connectable to each other and/or to first bearing ring 12a; 12b; 12c, the second bearing ring 14a; 14b; 14c, or the bearing cage 32b; 32c. The components 12c; 14c; 18c; 20c; 32c are described in greater detail in the discussion that of a third exemplary embodiment that follows. For example, in FIG. 3 an exchangeable connection between the main element 18b and the bearing cage 32b is realized by a screw 34b. Furthermore, the seal lips 20b could be clamped on the main element 18b, and this represents a further example of an exchangeable connection.

Figure 4:
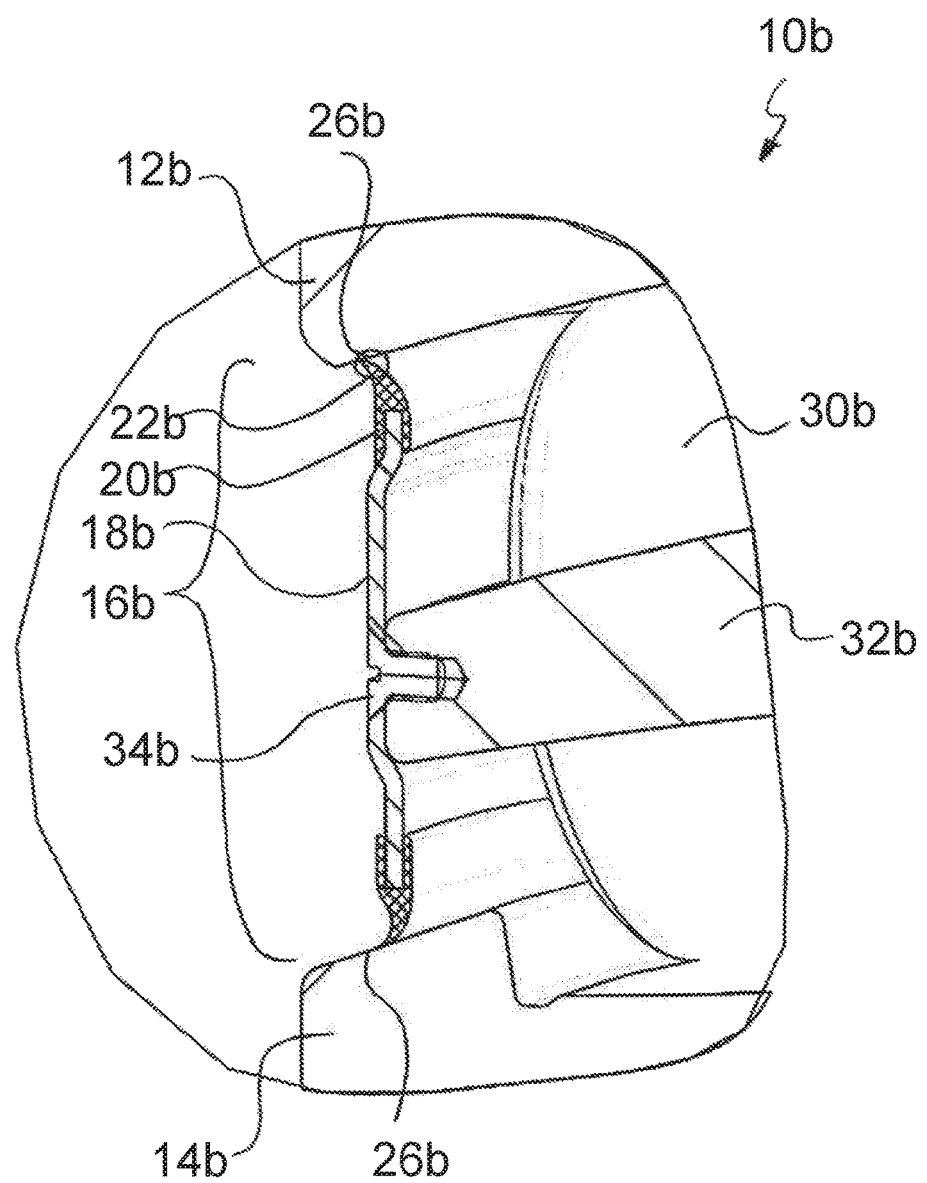
FIG. 4 shows a perspective view of a seal unit in a rolling-element bearing according to a second exemplary embodiment.

For further illustration the rolling-element bearing 10b including the seal unit 16b of the second embodiment is shown again in FIG. 4 sectionally and from another perspective. 3. In FIG. 3 as well as in FIG. 4 it can be seen that the main element 18b has an indentation in its central portion away from the rolling elements 30b which produces an offset bend towards the rolling elements 30b respectively on its outer and inner edges. The seal lips 20b are attached at the offset bend. The seal lips 20b thereby press onto the end surfaces 26b of the bearing rings 12b and 14b closer to the rolling elements (i.e. farther inward). In the case of a spherical roller bearing, more clearance could thereby be achieved when the inner and outer bearings tilt relative to each other, i.e. a greater possible tilting of the bearing can be accommodated.

Figure 5:
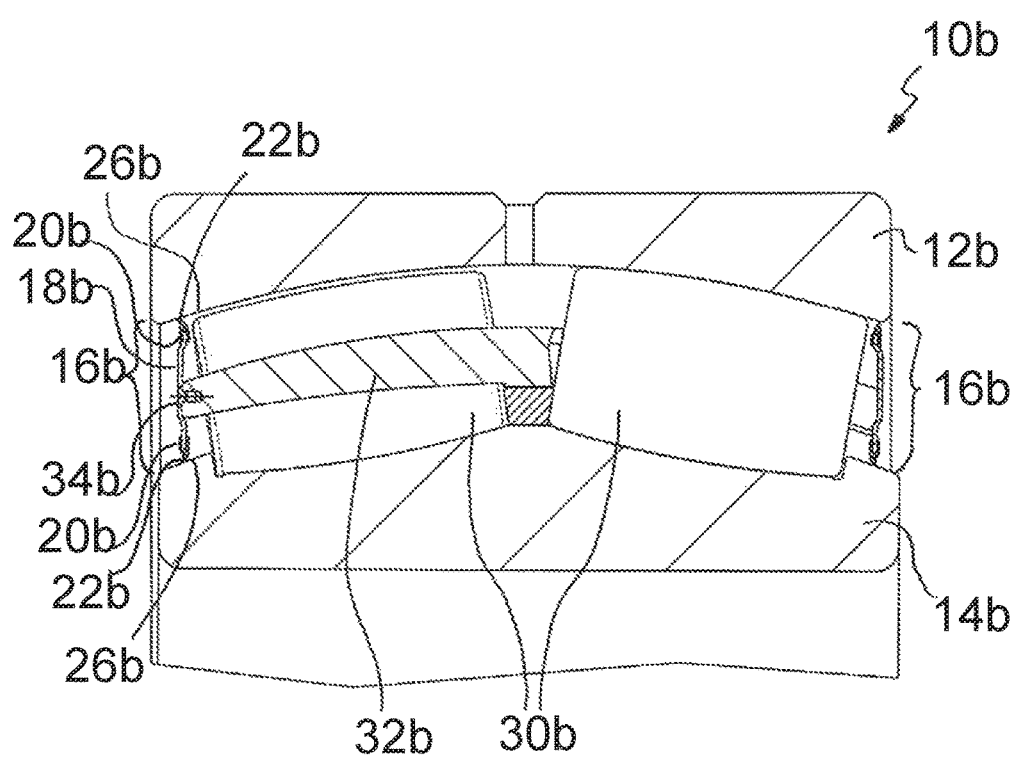
FIG. 5 shows a seal unit according to a second exemplary embodiment in a spherical roller bearing.

In some exemplary embodiments the first bearing ring 12a; 12b; 12c and the second bearing ring 14a; 14b; 14c are tiltable with respect to each other by a limited angle. Such bearings are also referred to as spherical roller bearings. In exemplary embodiments the maximum tilting between two bearing rings can be up to 0.5°, 1°, 2°, or 5°. FIG. 5 shows a frontal cross-sectional view through a spherical roller bearing 10b, wherein the inner bearing ring 14b is tilted by a small amount in the clockwise direction with respect to the outer bearing ring 12b. The rolling elements 30b, which in the present exemplary embodiment are disposed in two rows, are moved along by a guide profile of the bearing inner ring 14b. The bearing cage 32b partly surrounding the rolling elements 30b is likewise moved along with the rolling elements. Since the main element 18b is attached to the bearing cage 32b by the attachment means 34b, the main element 18b and the seal lips 20b (i.e. the entire seal unit 16b) are also moved along with the rolling elements 30b. A collision of the rolling elements 30b with the seal unit 16b when the spherical roller bearing 10b tilts could thus be avoided. In the second exemplary embodiment shown in FIG. 5, the seal lip 20b, which is in contact with the end surface 26b of the inner bearing ring 14b, can remain in contact with the end surface 26b, and always remain in the same position with respect thereto in the axial direction. However, when the bearing rings tilt, the seal lip 20b, which is in contact with the end surface 26b of the outer bearing ring 12b, can be shifted in the axial direction along the end surface 26b of the outer bearing 12b (which is simultaneously the raceway of the bearing ring 12b).

It can further be seen in FIG. 5 that two seal units 16b are attached to the two sides of the rolling-element bearing 10b. Despite tilting of the rolling-element bearing 10b, neither of the two seal units 16b extends beyond one of the bearing rings 12b or 14b in the axial direction. Even taking the tilting into account, the rolling-element bearing 10b including the seal unit 16b could thus be embodied in a very compact manner.

Figure 6:
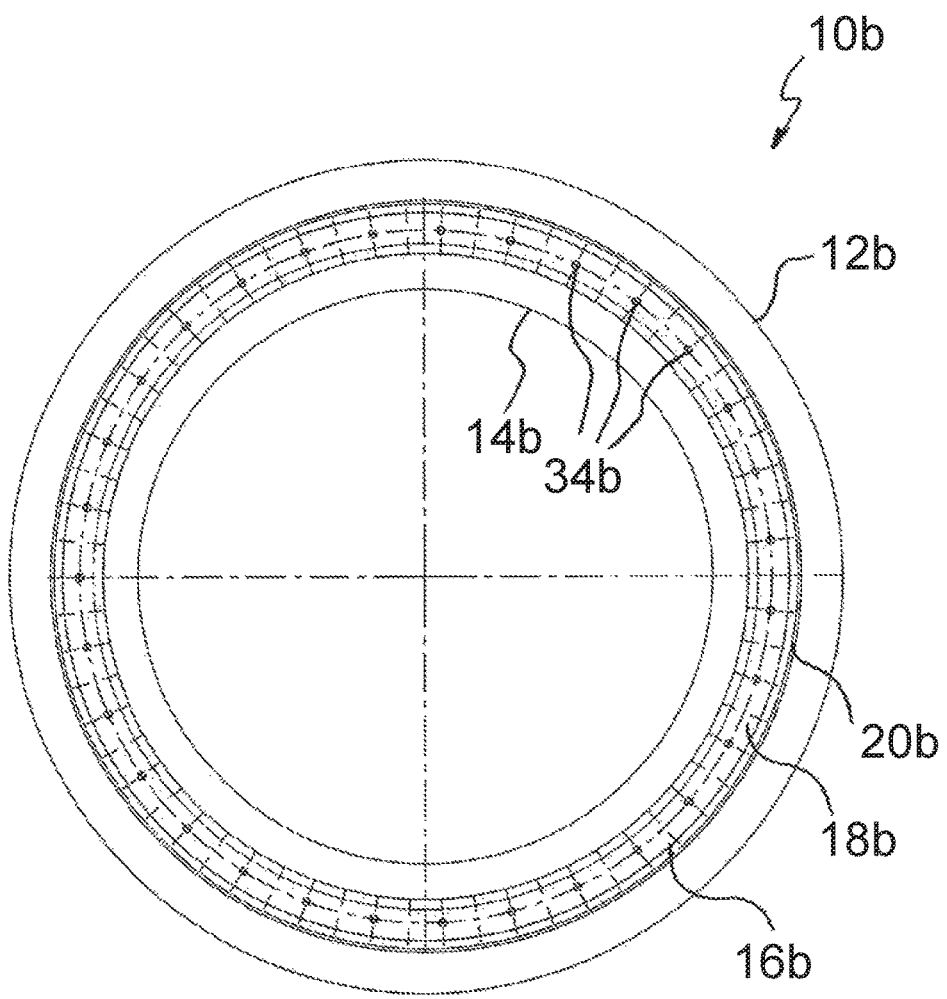
FIG. 6 shows a rolling-element bearing including a seal unit in overview according to a second exemplary embodiment.

In FIG. 6 the rolling-element bearing 10b including the seal unit 16b is once again shown in overview. The rolling-element bearing 10b and the seal unit 16b are fully pictured here. The intersection of the two dashed lines in this figure identifies a center point through which the axis of rotation of the bearing 10b extends in the non-tilted state (when the rings are not mutually tilted). As shown in FIG. 6, a plurality of attachment means 34b (in this case, a plurality of screws) could of course be used for attaching the main element 18b to the bearing cage 32b.

In some exemplary embodiments the rolling-element bearing 10a; 10b; 10c can have an external diameter or an external radius of at least 400 mm. The diameter of the rolling-element bearing 10b is measured along a straight path that begins at a side of the outer bearing ring 12b facing away from the center point, extends through the center point, and ends at an opposite side of the bearing outer ring 12b, which opposite side also faces away from the center point. For example, such a path could follow one of the two dashed lines shown in FIG. 6.

It can further be seen in FIG. 6 that the seal unit 16b has an annular form. However, the seal unit could also be formed of ring segments. For example, a seal unit 16a; 16b; 16b could be composed of two part-ring shaped segments which each follow an annular course of 180°, or the seal unit 16b could be composed of four part-ring shaped segments which each follow an annular course of 90°. However, the part-ring shaped segments could also be of different sizes.

Figure 7:
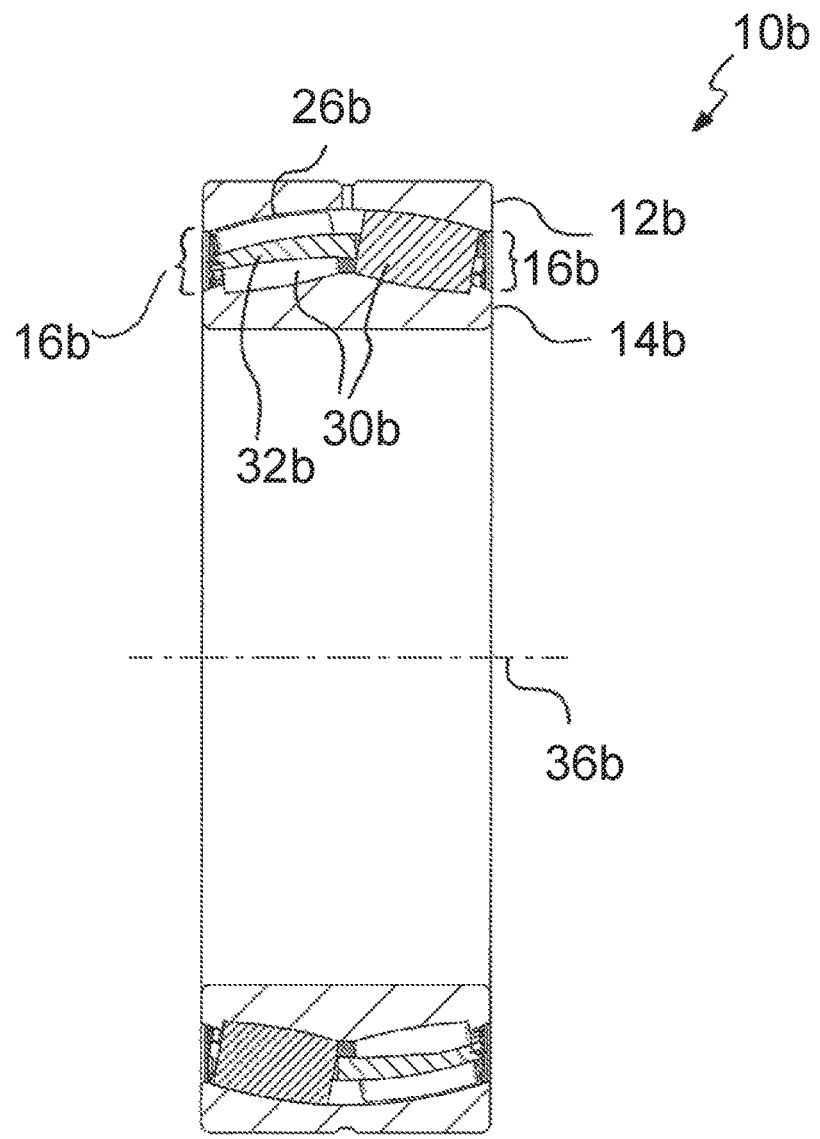
FIG. 7 shows a cross-section through a rolling-element bearing including a seal unit in side view according to a second exemplary embodiment.

FIG. 7 shows a cross-section through the rolling-element bearing 10b including a seal unit 16b in side view according to the second exemplary embodiment. Here the rolling-element bearing 10b can be seen in its full extent. Again two seal units 16b are provided, one on each side of the bearing 10b. A dashed line marks the central axis 36b or the axis of rotation of the rolling-element bearing 10b in a non-tilted state. Furthermore, it is clear that the raceway of the outer bearing ring 12b (or the end surface 26b of the outer bearing ring 12b) partially follows the surface of a sphere. This allows for a tilting of the inner bearing ring 14b with respect to the outer bearing ring 12b and for the movement of the rolling elements 30b along on the profile of the inner bearing ring 14b.

Figure 8:
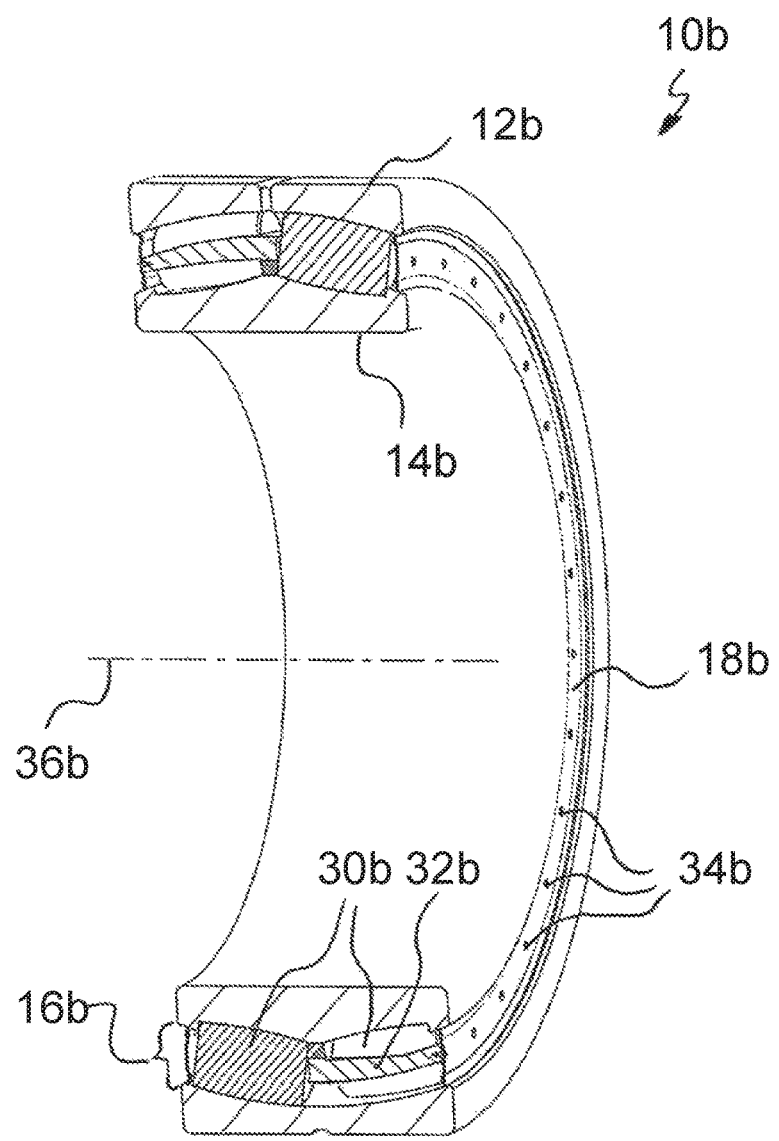
FIG. 8 shows a cross-section through a rolling-element bearing including a seal unit in perspective view according to a second exemplary embodiment.

FIG. 8 shows the same cross-section as FIG. 7 through the rolling-element bearing 10b including seal unit 16b, this time in perspective view.

Figure 9:
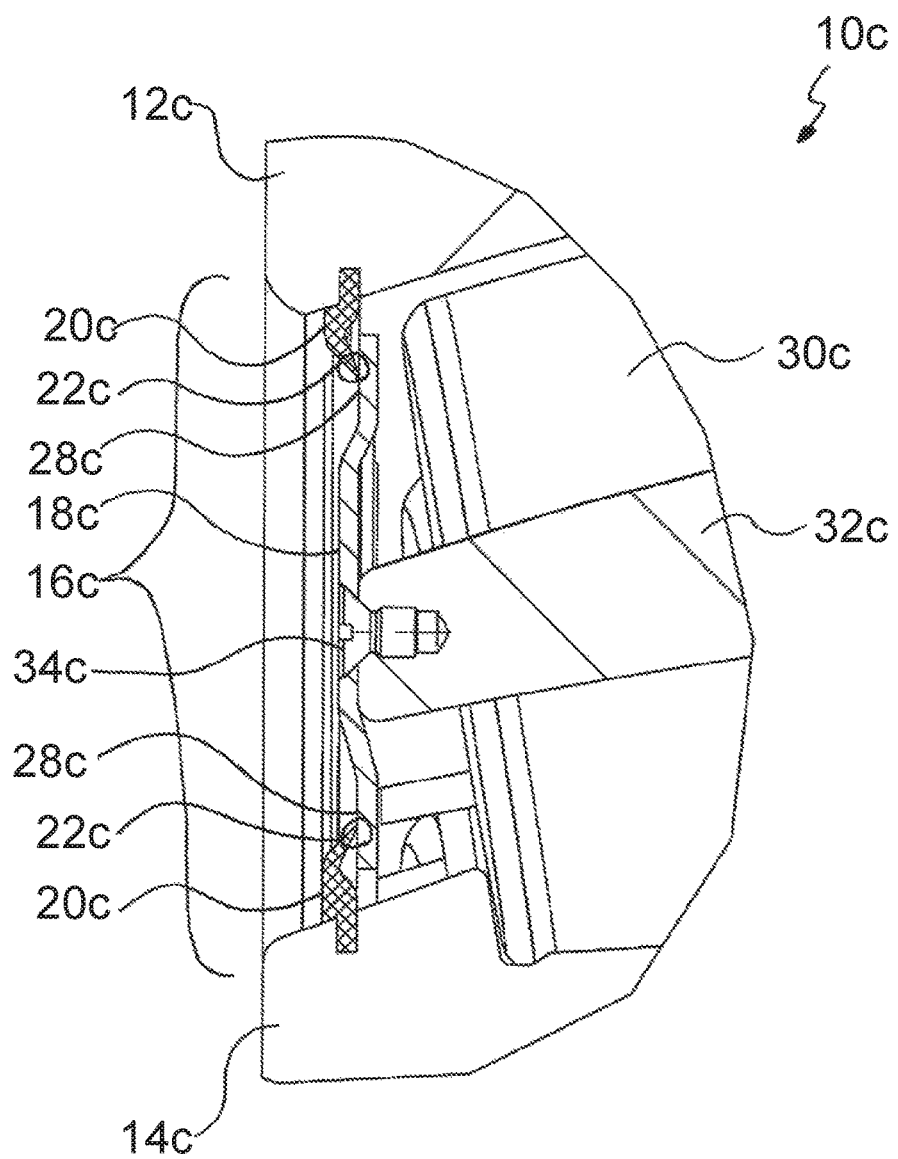
FIG. 9 shows a seal unit in a rolling-element bearing according to a third exemplary embodiment.

In the exemplary embodiments shown in the Figures, the seal lip 20a; 20b; 20c includes a seal surface 22a; 22b; 22c for sealing against the main element 18a; 18b; 18c and is attached to the first bearing ring 12a; 12b; 12c or the second bearing ring 14a; 14b; 14c. Such a third exemplary embodiment of a rolling-element bearing 10c including a seal unit 16c is shown in FIG. 9. The detail in FIG. 9 shows a cross-section through the seal unit 16c, as well as parts of the bearing rings 12c and 14c, of the bearing cage 32c, and of the rolling elements 30c. In contrast to the second exemplary embodiment, in this embodiment, the seal lips 20c are each attached to the inner bearing ring 14c and to the outer bearing ring 12c. In FIG. 9 the seal lips 20c are each introduced into a groove on the outer bearing ring 12c or the inner bearing ring 14c. In other exemplary embodiments, this connection could also be generated, for example, by adhesion or vulcanization. The two seal lips 20c have an offset bend towards the rolling elements 30c, i.e. in the axial direction. A seal surface 22c is found on each offset-bend end of the seal lips 20c. This seal surface 22c is in contact with an end surface 28c of the main element 18c.

In other words, in FIG. 9 the two seal lips are fixedly connected to the bearing rings 12c and 14c, but are in sliding contact with the main element 18c. During operation of the rolling-element bearing 10c, a seal lip 20c can thus be moved along with the rotating bearing ring 12c or 14c, while the main element 18c can be moved along with the bearing cage 32c, on which bearing cage the main element is attached with the attachment means 34c. In other words, in the exemplary embodiment shown in FIG. 9, the seal unit 16c comprises two seal lips 20c and a main element 18c, which during operation of the rolling-element bearing can each have different rotational speeds from one another. Exemplary embodiments in which the countersurfaces of the seal lips 20c are formed end surfaces 28c of the main element 18c (instead of by special surfaces on the inner ring 14c or outer ring 12c of the bearing 10c), could be used, for example, in large rolling-element bearings. Wear of the end surface 28c could be easily repaired since a simple exchange of the main element 18c and optionally of the seal lips 20c might be all that is necessary to effect the repair. Since the main element 18c is also attached to the bearing cage 32c, low wear and low friction could also allow for higher bearing rotational speeds.

In some exemplary embodiments, the seal lips 20c can be manufactured from an elastic material. In this case the offset-bent seal surface 22c of the seal lip 20c attached to the outer bearing ring 12c could provide so much clearance that a limited tilting of the inner bearing ring 14c with respect to the outer bearing ring 12c would be possible. The sealing function of the seal lip 20c could thus be maintained even if the bearing 10c tilts. If the inner bearing ring 14c in FIG. 9 tilts, the seal lip 20c located on the bearing ring 14c, the rolling elements 30c, the bearing cage 32c, and the main element 18c would move along with the inner bearing ring 14c.

Figure 10:
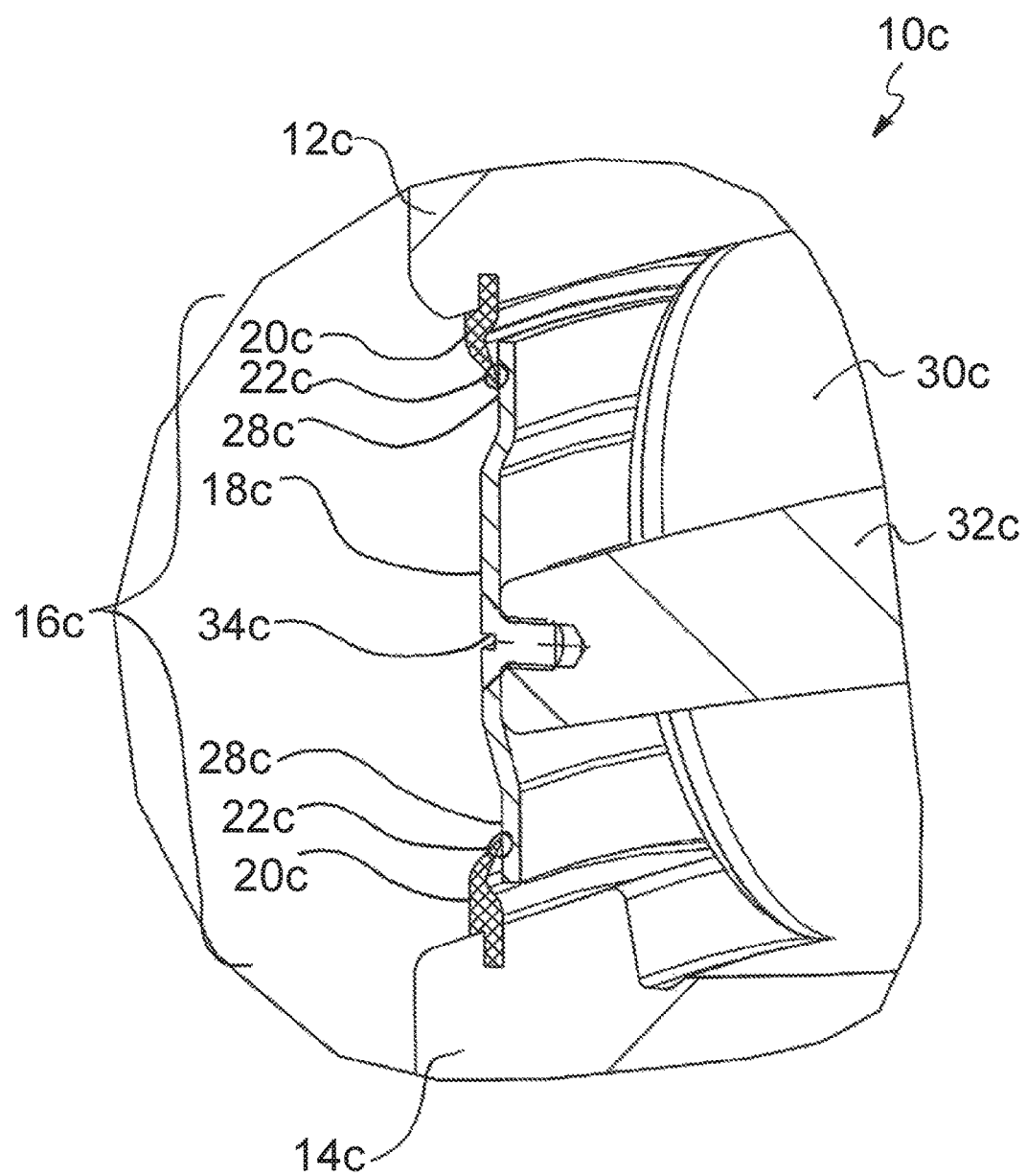
FIG. 10 shows a perspective view of a seal unit in a rolling-element bearing according to a third exemplary embodiment.
Figure 11:
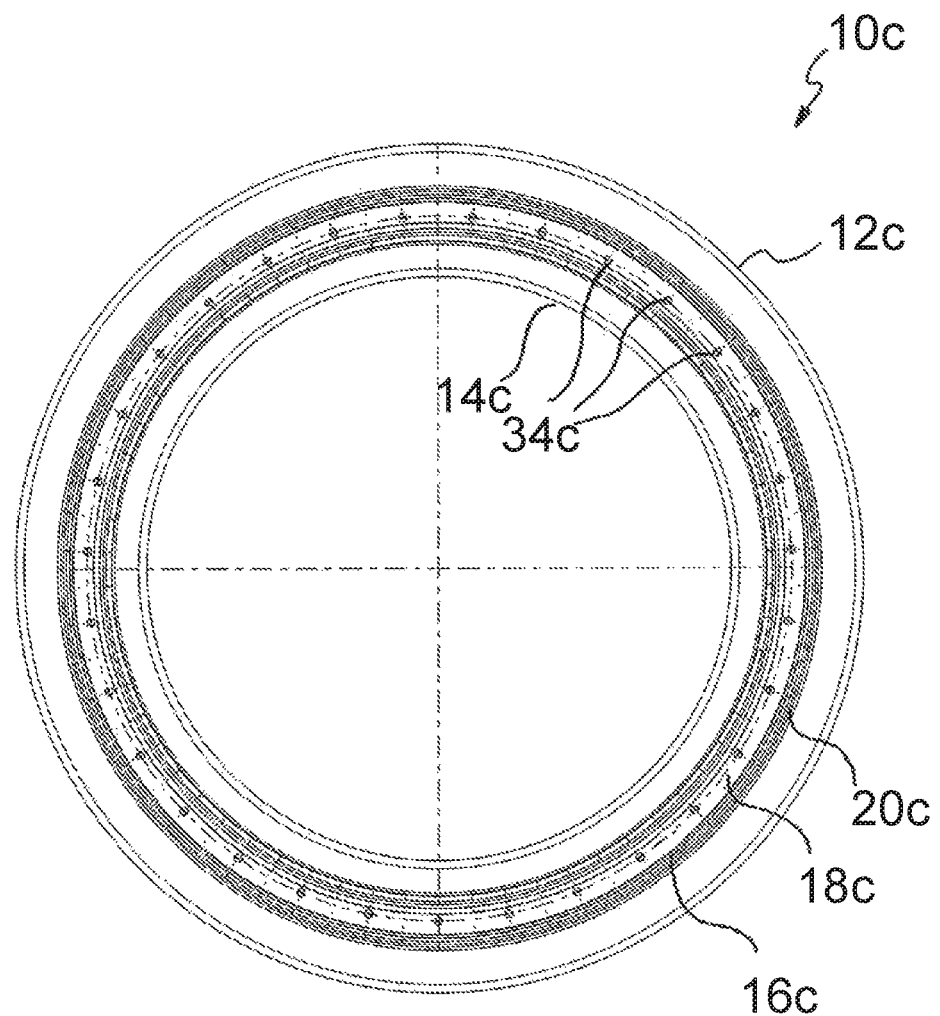
FIG. 11 shows a rolling-element bearing including a seal unit in overview according to a third exemplary embodiment.

FIG. 10 shows the same detail of the rolling-element bearing 10c, again in a perspective cross-section view. Furthermore, FIG. 11 shows the entire rolling-element bearing 10c and the entire seal unit 16c in overview. Here it is again clear that the seal unit 16c is annular. As already stated, the embodiment of the seal unit 16c (or of the main element 18c or of the seal lip 10c) could also be part-ring shaped.

Figure 12:
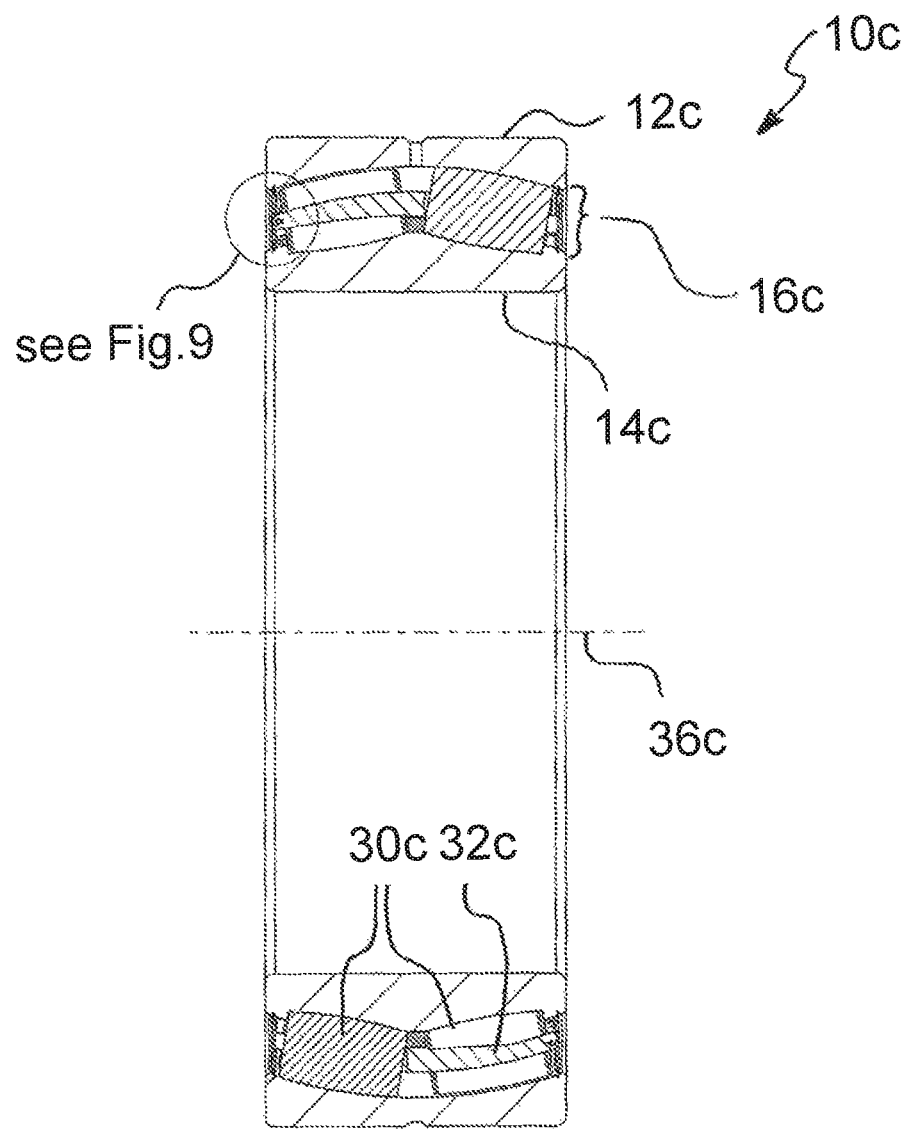
FIG. 12 shows a cross-section through a rolling-element bearing including a seal unit in side view according to a third exemplary embodiment.

FIG. 12 shows a cross-section through the rolling-element bearing 10c including the seal unit 12c in side view. The central axis 36c is again indicated by a dashed line. Furthermore, a seal unit 16c is located on each of the two sides of the bearing 10c. A region marked with a circle shows the area which is depicted in detail in FIG. 9.

Figure 13:
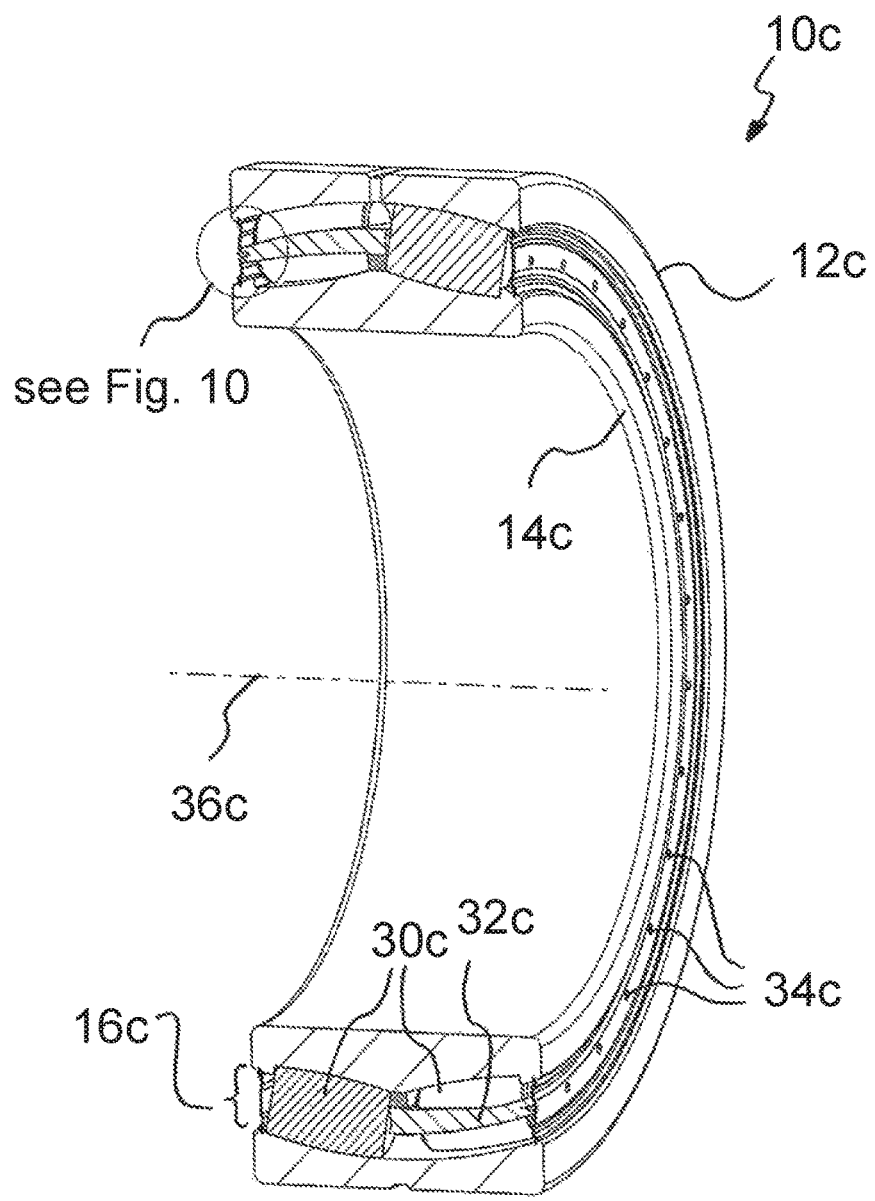
FIG. 13 shows a cross-section through a rolling-element bearing including a seal unit in perspective view according to a third exemplary embodiment.
Figure 14:
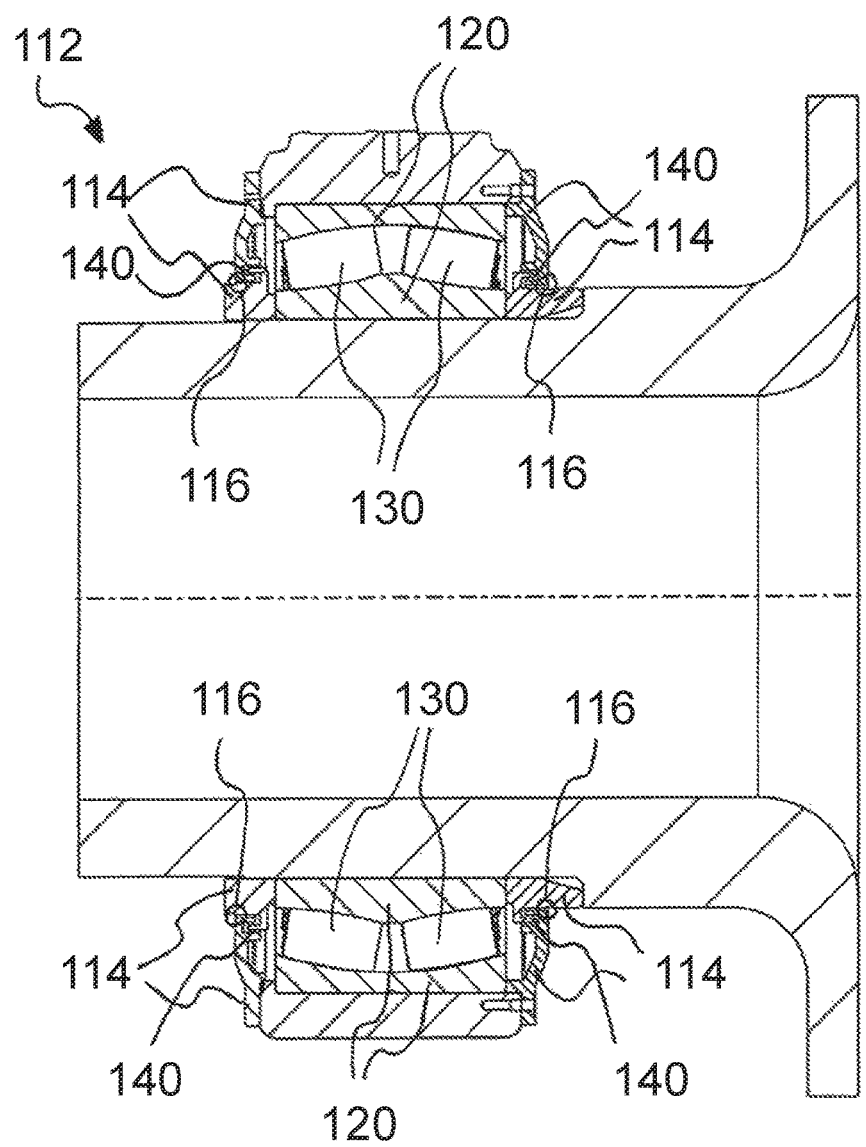
FIG. 14 shows a conventional construction of a labyrinth seal as a comparative example.
Figure 15:
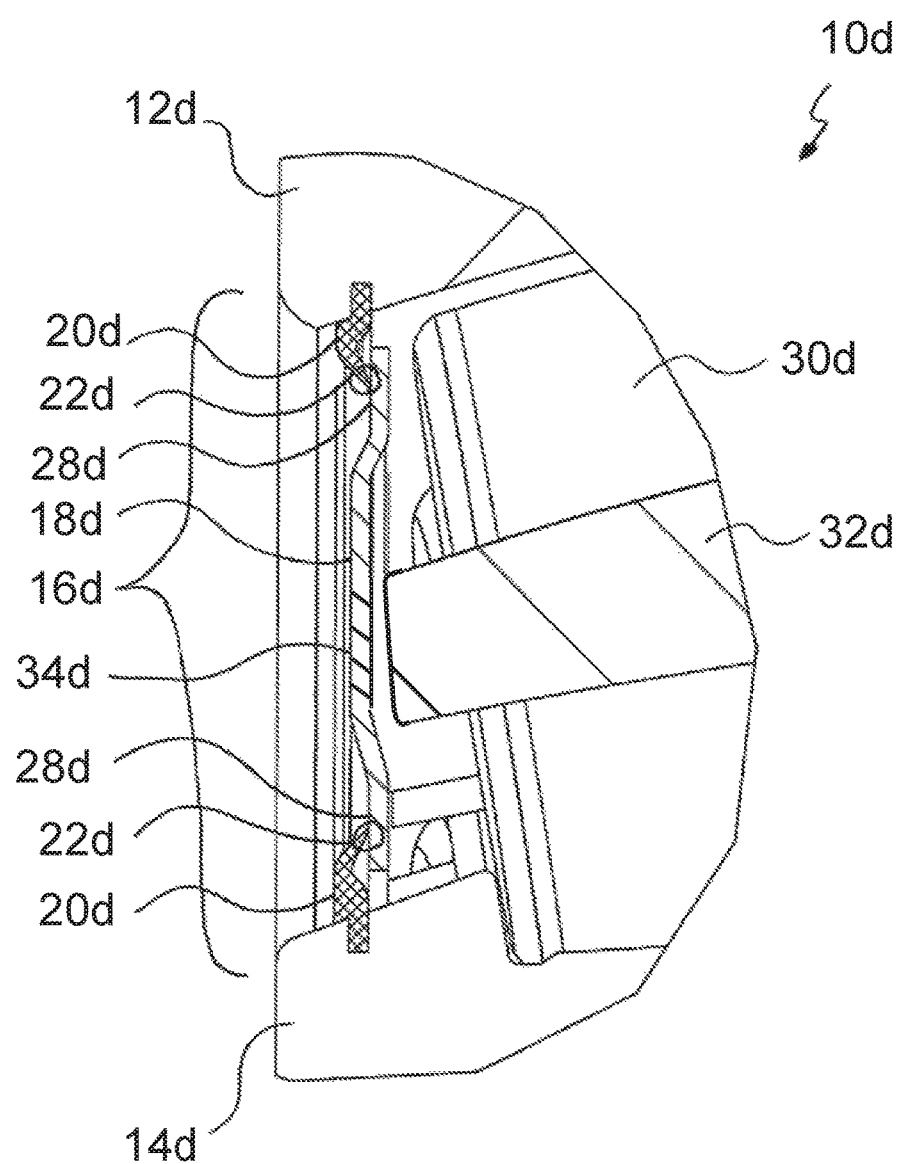
FIG. 15. shows a perspective view of a seal unit with a seal surface of a seal lip contacting a radially extending end surface of a first bearing ring in a rolling-element bearing.

FIG. 13 is a cross-section through the rolling-element bearing 10c including the seal unit 16c in perspective view. A circle marks the region which is depicted in detail in FIG. 10.

In all exemplary embodiments, the constant position of the main element 18a; 18b; 18c with respect to the rolling elements 30a; 30b; 30c helps ensure that the main element 18a; 18b; 18c follows a tilting movement (pivoting, wobbling) of the bearing 10a; 10b; 10c, and prevents contact between the rolling elements 30a; 30b; 30c and main element 18a; 18b; 18c from occurring. Due to the exchangeable connection, the seal unit 16a; 16b; 16c could be easily installed or removed, even after the bearing 10a; 10b; 10c has been installed. This could significantly facilitate installation and maintenance work. For various uses, uses in the field of wind power for example, a seal unit 16a; 16b; 16c could be exchanged without needing to remove the complete bearing 10a; 10b; 10c. This could also reduce the costs resulting from wear by making it easier to exchange the seal. A part-ring shaped embodiment of the main element 18a; 18b; 18c (or of the seal unit 16a; 16b; 16c) could further simplify an installation and removal processes, because further components would not need to be removed. The easy installation and removal of the seal unit 16a; 16b; 16c, also makes it possible to subsequently supply or renew the lubricant.

Assessment measures or inspections, for example of rolling elements, bearing rings, etc., could be considerably facilitated by a temporary removal of the seal lips 20a; 20b; 20c. In comparison to conventional solutions, the exemplary embodiments discussed herein could also provide greater angular or axial mobility of the bearing 10a; 10b; 10c (spherical roller bearing).

In some exemplary embodiments the seal lip 20a; 20b; 20c can be manufactured from elastomer or plastic. This would allow for an exchange of the seal lip 20a; 20b; 20c in a simple manner. In this way the seal unit 16a; 16b; 16c could be used in applications wherein long service life is required, for example in wind turbines.

The exchangeable connection of the main element 18a; 18b; 18c, allows for simple removal and, for example, a manual inspection of the raceways, rolling elements 30a; 30b; 30c of the bearing cage 32a; 32b; 32c, etc. Likewise, targeted grease samples could be taken for lubricant analysis, since now all regions of the rolling-element bearing 10a; 10b; 10c can be opened and made freely accessible.

In comparison to conventional solutions, the space inside the rolling-element bearing 10a; 10b; 10c to be filled by lubricant could be significantly reduced by exemplary embodiments, which would result in the need for less lubricant. In exemplary embodiments the seal unit 16a; 16b; 16c could also be embodied from light material, which could lead to a material cost reduction, a weight reduction, and thus to a simplified, time-efficient installation. A factory prelubrication could also be performed which would prevent contamination during the installation of the otherwise unsealed open bearing 10a; 10b; 10c.

Due to the simple design in comparison to the conventional solution, investments required for prototypes and small quantities could be economical. For an intended series production, known manufacturing methods, such as injection molding, vulcanization, or others could be used.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seals for bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10a; 10b; 10c Rolling-element bearing
12a; 12b; 12c First bearing ring
14a; 14b; 14c Second bearing ring
16a; 16b; 16c Seal unit 18a; 18b; 18c Main element
20a; 20b; 20c Seal lip
22a; 22b; 22c Seal surface of the seal lip
24a Groove
26b End surface
28c End surface
30a; 30b; 30c Rolling elements
32a; 32b; 32c Bearing cage
34b; 34c Attachment means
36a; 36b; 36c Central axis
112 Large bearing
114 Labyrinth ring
116 V-ring
120 Bearing ring
130 Rolling elements
140 Labyrinth

The invention claimed is:

1. A rolling-element bearing comprising:
a first bearing ring,
a second bearing ring, and
a seal unit formed in a multiple-piece manner, wherein the seal unit comprises an at least part-ring shaped main element which is freely rotatable with respect to the first bearing ring and the second bearing ring, and at least one seal lip,
wherein the main element and the seal lip are exchangeably connectable to each other,
wherein the seal lip is rotatable with respect to the first bearing ring or the second bearing ring and is attached to the main element;
wherein the seal lip includes a seal surface for sealing against the first bearing ring or the second bearing ring which is in sliding contact with the first bearing ring or the second bearing ring,
wherein a rotational speed of the freely rotatable main element is determined by frictional forces occurring between the seal lip and the first bearing ring or the second bearing ring due to the sliding contact of the seal lip with the first bearing ring or the second bearing ring, and
wherein the first bearing ring and the second bearing ring are tiltable by a limited angle with respect to each other.

2. The rolling-element bearing according to claim 1, wherein a seal surface of the seal lip contacts a groove of the first bearing ring or a groove of the second bearing ring.

3. The rolling-element bearing according to claim 1, wherein after installation in the rolling-element bearing, the main element or the at least one seal lip is symmetric with respect to a plane perpendicular to an axis of rotation of the rolling-element bearing.

4. The rolling-element bearing according to claim 1, wherein the rolling-element bearing has an outer diameter of at least 400 millimeters.

5. The rolling-element bearing according to claim 1,
wherein after installation in the rolling-element bearing, the main element or the at least one seal lip is symmetric with respect to a plane perpendicular to an axis of rotation of the rolling-element bearing,
wherein the rolling-element bearing has an outer diameter of at least 400 millimeters.

6. A rolling-element bearing according to claim 1,
wherein the seal lip is non-destructively detachably connected to the main element.

7. The rolling-element bearing according to claim 1, wherein the main element is plate shaped.

8. The rolling-element bearing according to claim 1, wherein the main element is made from metal or metal alloys or from low-friction plastics or from plastics having a high stiffness, and the seal lip is made from rubber-type materials or from low-stiffness plastics, elastomers or thermoplastics.

9. A rolling-element bearing comprising:
a first bearing ring,
a second bearing ring, and
a seal unit formed in a multiple-piece manner, wherein the seal unit comprises an at least part-ring shaped main element which is freely rotatable with respect to the first bearing ring and the second bearing ring, and at least one seal lip,
wherein the seal lip is exchangeably connectable to the first bearing ring or to the second bearing ring
wherein the seal lip is rotatable with respect to the main element and is attached to the first bearing ring or the second bearing ring,
wherein the seal lip includes a seal surface for sealing against the main element, which is in sliding contact with the main element,
wherein an rotational speed of the freely rotatable main element is determined by frictional forces occurring between the seal lip and the main element due to the sliding contact of the seal lip with the main element.

10. The rolling-element bearing according to claim 9, wherein the seal surface of the seal lip contacts a radially extending end surface of the main element.

11. The rolling-element bearing according to claim 9, wherein after installation in the rolling-element bearing, the main element or the at least one seal lip is symmetric with respect to a plane perpendicular to an axis of rotation of the rolling-element bearing.

12. The rolling-element bearing according to claim 9, wherein the rolling-element bearing has an outer diameter of at least 400 millimeters.

13. The rolling-element bearing according to claim 9, wherein the first bearing ring and the second bearing ring are tiltable by a limited angle with respect to each other.

14. The rolling-element bearing according to claim 9,
wherein the seal lip is rotatable with respect to the main element,
wherein a seal surface of the seal lip contacts a radially extending end surface of the main element,
wherein the seal lip includes a seal surface for sealing against the main element and is attached to the first bearing ring or the second bearing ring.

15. The rolling-element bearing according to claim 9,
wherein after installation in the rolling-element bearing, the main element or the at least one seal lip is symmetric with respect to a plane perpendicular to an axis of rotation of the rolling-element bearing,
wherein the rolling-element bearing has an outer diameter of at least 400 millimeters, and
wherein the first bearing ring and the second bearing ring are tiltable by a limited angle with respect to each other.

16. The rolling-element bearing according to claim 9, wherein the main element is plate shaped.

17. The rolling-element bearing according to claim 9, wherein the main element is made from metal or metal alloys or from low-friction plastics or from plastics having a high stiffness, and the seal lip is made from rubber-type materials or from low-stiffness plastics, elastomers or thermoplastics.

* * * * *